US010614533B2

(12) United States Patent
Carpency et al.

(10) Patent No.: US 10,614,533 B2
(45) Date of Patent: Apr. 7, 2020

(54) METHODS FOR OPTIMIZING PETROCHEMICAL FACILITIES THROUGH STREAM LINED TRANSFERAL

(71) Applicant: ExxonMobil Chemical Patents Inc., Baytown, TX (US)

(72) Inventors: Joseph F. Carpency, Seabrook, TX (US); Xueyu S. Chen, Houston, TX (US); Marie S. Delaroche, Allouville Bellefosse (FR)

(73) Assignee: ExxonMobil Chemical Patents Inc., Baytown, TX (US)

( * ) Notice: Subject to any disclaimer, the term of this patent is extended or adjusted under 35 U.S.C. 154(b) by 249 days.

(21) Appl. No.: 15/280,051

(22) Filed: Sep. 29, 2016

(65) Prior Publication Data

US 2017/0178255 A1    Jun. 22, 2017

Related U.S. Application Data

(60) Provisional application No. 62/269,226, filed on Dec. 18, 2015.

(51) Int. Cl.
| | | |
|---|---|---|
| *C10G 51/06* | (2006.01) | |
| *G06Q 50/06* | (2012.01) | |
| *G06Q 10/06* | (2012.01) | |
| *C10G 9/00* | (2006.01) | |
| *C10G 9/36* | (2006.01) | |
| *C10G 11/00* | (2006.01) | |
| *C10G 47/36* | (2006.01) | |

(52) U.S. Cl.
CPC ............... *G06Q 50/06* (2013.01); *C10G 9/00* (2013.01); *C10G 9/36* (2013.01); *C10G 11/00* (2013.01); *C10G 47/36* (2013.01); *C10G 51/06* (2013.01); *G06Q 10/067* (2013.01); *C10G 2400/20* (2013.01)

(58) Field of Classification Search
CPC ..................................................... C10G 51/06
See application file for complete search history.

(56) References Cited

U.S. PATENT DOCUMENTS

| 4,197,868 A | 4/1980 | Carson |
| 5,666,297 A | 9/1997 | Britt et al. |
| 6,442,513 B1 | 8/2002 | Cheng et al. |
| 6,632,351 B1 | 10/2003 | Ngan et al. |
| 6,721,610 B2 | 4/2004 | Gade et al. |
| 7,090,765 B2 | 8/2006 | Spicer et al. |
| 7,097,758 B2 | 8/2006 | Stell et al. |
| 7,138,047 B2 | 11/2006 | Stell et al. |
| 7,220,887 B2 | 5/2007 | Stell et al. |
| 7,235,705 B2 | 6/2007 | Stell |
| 7,244,871 B2 | 7/2007 | Stell et al. |
| 7,247,765 B2 | 7/2007 | Stell et al. |
| 7,257,451 B2 | 8/2007 | Carpency et al. |
| 7,297,833 B2 | 11/2007 | Beattie et al. |
| 7,311,746 B2 | 12/2007 | Stell et al. |
| 7,312,371 B2 | 12/2007 | Stell et al. |
| 7,351,872 B2 | 4/2008 | Stell et al. |
| 7,488,459 B2 | 2/2009 | Stell et al. |
| 7,578,929 B2 | 8/2009 | Stell et al. |
| 7,820,035 B2 | 10/2010 | McCoy et al. |
| 8,036,759 B2 * | 10/2011 | Sheth ............... G05B 17/02 700/117 |
| 8,038,931 B1 | 10/2011 | Thomas et al. |
| 8,775,138 B2 | 7/2014 | Carpency et al. |
| 2003/0097243 A1 | 5/2003 | Mays et al. |

OTHER PUBLICATIONS

M. M. El-Halwagi and H. D. Spriggs, Solve Design Puzzles with Mass Integration, 94 Chem. Eng. Prog. 25-44 (1998).*
E. P. Schulz et al., Optimal Shutdown Policy for Maintenance of Cracking Furnaces in Ethylene Plants, 45 Ind. Eng. Chem. Res. 2748-2757 (2006).*
C. Liu et al., Cyclic Scheduling for Best Profitability of Industrial Cracking Furnace System, 34 Comput. Chem. Eng. 544-554 (2010).*
Miguel Bagajewicz et al., "Multiple plant heat integration in a total site", AICHE Journal, vol. 48, No. 10, Oct. 2002, pp. 2555-2270.
Hernan Rodera et al, "Targeting procedures for energy savings by heat integration across plants", AICHE Journal vol. 45, No. 8, Aug. 1999, pp. 1721-1742.
Hernan Rodera et al." Multipurpose Heat-Exchanger Networks for Heat Integration Across Plants", Industrial & Engineering Chemistry Research., vol. 40, No. 23, Oct. 2001, pp. 5585-5603.
M. Beninca et al., "Heat Integration of an Olefins Plant: Pinch Analysis and Mathermatical Optimization working together", Brazilian Journal of Chemical Engmeering, vol. 28, No. 1,Jan. 2011, pp. 101-116.

(Continued)

*Primary Examiner* — Randy Boyer (57) ABSTRACT

Methods and processes for moving towards optimizing one or more parameters in a parallel train comprising two hydrocarbon cracking facilities where the two facilities either have non-identical process unit configurations or are operating under non-identical process conditions are disclosed. These methods and processes use models to simulate the impact of interconnecting the facilities by partially withdrawing an intermediate stream from within one cracking facility and adding the partially withdrawn stream to the second cracking facility in order to better optimize the overall operation of the parallel train.

14 Claims, 5 Drawing Sheets

(56) References Cited

OTHER PUBLICATIONS

Liu, C., Zhang, J., Xu, Q., & Li, K. (2010). Cyclic scheduling for best profitability of industrial cracking furnace system. Computers & chemical engineering, 34(4), 544-554.†
El-Halwagi, M. M.; Spriggs, H. D. Solve Design Puzzles with Mass Integration. Chem. Eng. Prog. 1998, 94, 25-44.†

\* cited by examiner
† cited by third party

METHODS FOR OPTIMIZING PETROCHEMICAL FACILITIES THROUGH STREAM LINED TRANSFERAL

CROSS REFERENCE TO RELATED APPLICATIONS

This application claims priority to and the benefit of U.S. Provisional Application Ser. No. 62/269,226, filed Dec. 18, 2015, and European Patent Application No. 16159167.2 filed Mar. 8, 2016, which are incorporated herein by reference.

FIELD OF THE INVENTION

The present invention generally relates to using non-linear programming (NLP) models or linear programming (LP) models derived therefrom for optimizing multiple process facilities simultaneously and in conjunction with one another.

BACKGROUND OF THE INVENTION

Industrial process facilities, such as chemical, petroleum, and petrochemical processing facilities, typically include a plurality of separate process units or sections thereof that function together to achieve the overall objective of the facility. This separation of function among the process units can lead to difficulties in effectively controlling and optimizing facility operation. These difficulties result from the wide variety of separate process units and equipment that may be contained in each facility, as well as the large number of process potential feedstocks and feedstock compositions, operating variables (e.g., flow rates, temperatures, pressures, etc.), product specifications, market constraints and prices (e.g., for feeds, products, and utilities), mechanical constraints, transportation and storage constraints, and weather conditions.

In an attempt to overcome these difficulties, computer models have been developed which can be used to accurately simulate and/or optimize the facility's operation. Two classes of models have been developed: first principles reference tools and derived tools. First principles reference tools are models that are based on first principles i.e., mathematical relationships or logic that utilize accepted scientific theories or laws, such as those regarding chemical thermodynamics and/or kinetics. Such tools typically possess the capability to separately model many or all of the individual process units in a process facility. First principles reference tools typically contain a library of thermodynamic information relating to the behavior of different molecules, components, or pseudo-components in these process units. These tools can be used to create a model of a process facility, or section thereof, by using the thermodynamic library to individually model the various process units in the facility. The model can then be used to simulate connections between process units to model the overall facility. For example, such a model can then directly provide heat and material balance information, which can be used for design, equipment rating, equipment performance, simulation, and optimization of the facility. Examples of commercially-available first principles reference tools include HYSIS® and Aspen Plus®, which are products of Aspen Technologies Incorporated of Cambridge, Mass.; PRO/II®, which is a product of SimSci-Esscor, an operating unit of Invensys plc of Cheshire, United Kingdom; and SPYRO®, which is a product of Technip-Coflexip SA of Paris, France.

Recently, a new generation of first principles reference tools has been developed for modeling, solving, and optimizing an entire process facility. Examples of these new reference tools are AspenTech RT-OPT®, which is a product of Aspen Technologies Incorporated of Cambridge, Mass., and SimSci ROMeo®, which is a product of SimSci-Esscor, an operating unit of Invensys plc, of Cheshire, United Kingdom. These tools are capable of solving very large simulation or optimization problems, usually via a non-linear simultaneous equation solver and/or optimizer.

Derived tools require less computing power and time than do first-principles tools to solve a problem of similar size and complexity. Derived tools possess very convenient structures, albeit simplified, to depict many or all of the process unit operations needed to model a process facility. These derived tools also have convenient report writing capabilities, and may possess various analysis tools for placing the modeling results in a form that can be more readily implemented. In general, derived tools use either linear programming (LP) or sequential linear programming (SLP) type mathematics to solve optimization problems.

Derived tools do not have the capability to model process unit operations based on first principles, nor do they contain a thermodynamic library. Consequently, these derived tools cannot directly provide heat and material balance information for use in design, equipment rating, equipment performance, simulation, and optimization of the facility. Instead, a derived tool model typically utilizes information about the facility that has been obtained from (i) one or more of the first principles tools (e.g, HYSIS®, Aspen Plus®, PRO/II®, and SPYRO®, referred to above), and/or (ii) other commercially available engineering tools that would be well known to persons skilled in the art of modeling industrial process facilities. This information is then imported into the derived tool.

Nevertheless, given convenient form and analysis capabilities, as well as the computing advantages of LP or SLP programming, derived tools found use in operational planning, feedstock selection, and optimization of manufacturing facilities. Examples of commercially available derived tools are AspenTech PIMS®, which is a product of Aspen Technology Incorporated of Cambridge, Mass., and SimSci Petro®, which is a product of SimSci-Esscor, an operating unit of Invensys plc., of Cheshire, United Kingdom.

More recently, models based on a combination of first principles reference tools and derived tools have been developed for large process facilities. Such models typically treat a large processing facility as two or more facilities, where each facility is broken into two or more separate models of individual process units and interconnected to represent the overall facility. Methods that have been developed utilizing first principles reference tools, derived tools, or a combination thereof for simulating a process facility will now be described.

U.S. Patent Application Publication No. 2003/0097243 A1 discloses a computerized system and method for operating a hydrocarbon or chemical production facility, comprising mathematically modeling the facility; optimizing the mathematical model with a combination of linear and non-linear solvers; and generating one or more product recipes based upon the optimized solution. In one aspect, the mathematical model further comprises a plurality of process equations having process variables and corresponding coefficients. Typically, these process variables and corresponding coefficients are used to create a matrix in a linear program. The linear program may be executed by recursion or distributed recursion. Upon successive recursive passes, updated values for a portion of the process variables and corresponding coefficients are calculated by the linear solver and by a non-linear solver, and the updated values for the process variables and corresponding coefficients are substituted into the matrix. Unfortunately, the simultaneous use of multiple solvers, some of which are non-linear, can result in significant computing time and resource disadvantages.

U.S. Pat. No. 5,666,297 discloses a software system for simulating and optimizing a processing plant design. The software system includes a plurality of dual mode equipment models for simulating each piece of equipment in the processing plant design. A sequential modular simulation routine uses the equipment models in a first mode to define a first set of values of the operating parameters of the processing plant design. Then, a simultaneous simulation/optimization routine utilizes the first set of values for the plant's operating parameters from the sequential simulation routine and subsequently determines, using the equipment models in a second mode, a second set of values of the operating parameters at which the processing plant design is optimized. The first and second sets of values for the operating parameters are stored in a common plant model file.

U.S. Pat. No. 6,442,513 discloses a method for real-time optimization of an oil refinery, or a portion thereof, where a fluid stream having multiple compositional components is modeled as a plurality of pseudo-components. Each compositional component has a boiling point, and each pseudo-component has a pre-defined boiling point and includes all compositional components from the fluid stream having approximately the pre-defined boiling point. According to this patent, good modeling results may be obtained by grouping compounds and molecules into pseudo-components or lumps based on boiling points, and by defining each input and output to a particular model according to the lumps. This is especially true in view of the fact that much of the operation of a refinery depends on boiling points of compositional components of crude oil.

U.S. Pat. No. 6,721,610 discloses a method for pre-calculating the parameters of industrial processes and/or products. According to this method, a vector of admissible input variables of the industrial process and/or product is defined. Definition ranges are assigned to each variable in the input vector. A process output vector is determined containing the process parameters to be pre-calculated. Known information on the process is stored in a data bank and ranges of validity for the process input variables are allocated to this information. For each process input vector inputted from an admissible definition range provided with valid information, exactly one process output vector is determined according to the information.

U.S. Pat. No. 7,257,451 discloses a method for creating an LP model of an industrial process facility from a first principles reference tool to interactively simulate and/or optimize the operation of the facility to facilitate or optimize feedstock selection and/or economic analyses based on varying prices, availabilities, and other external constraints.

U.S. Pat. No. 8,775,138 discloses methods and systems for withdrawing a stream from an LP model of a manufacturing facility. These methods and systems are useful for simulating the impact of partially withdrawing intermediate streams from within a process facility to simulate the impact on products and facilities in order to interactively simulate and/or optimize the operation of the facility to facilitate or optimize feedstock selection and/or economic analyses based on varying prices, availabilities, and other external constraints.

However, these previously developed methods are limited to using models to simulate and optimize a process facility as a standalone entity. As such, they fail to identify optimization possibilities that might be realized by interconnecting two or more process facilities. There is a need, therefore, for methods which can use models to simultaneously optimize a plurality of interconnected process facilities.

SUMMARY OF THE INVENTION

The present invention fulfills the need for a method which can use models to simultaneously optimize a plurality of interconnected process facilities by providing novel methods and processes which can use models to simulate the impact of partially withdrawing an intermediate stream from within one process facility and adding the partially withdrawn stream to one or more additional facilities in order to optimize the overall operation of the interconnected process facilities.

Certain aspects of the invention relate to chemical conversion methods and processes comprising moving towards optimizing one or more parameters in a parallel train comprising two hydrocarbon cracking facilities where the two facilities either have non-identical process unit configurations or are operating under non-identical process conditions. For instance, particular aspects of the invention relate to optimizing one or more parameters in the event that one or more process units, e.g., a steam cracker, in at least the first of the two cracking facilities is taken offline. In such aspects, a model of the first cracking facility is used to generate a simulation for the parallel train of removing from service a number of, but not all, process units in the first facility, wherein the removal results in a deviation from the optimal range of at least one of the parameters, preferably energy efficiency. From this simulation, an amount of an interconnecting fluid flow comprising a partially withdrawn intermediate stream from the second facility to be added to the first facility in order to lessen the deviation is obtained. The obtained amount of the interconnecting fluid flow is then diverted from the second facility to the first facility. Optionally, a model of the second facility can be used to simulate diverting the obtained amount of the interconnecting fluid flow. From this simulation, an amount of an increase to the feed flow to the second facility in order to move towards optimizing an additional parameter, such as product yield, can be obtained. The feed flow to the second facility is then increased to the obtained amount.

In other aspects, the invention relates to a steam cracking system for producing ethylene comprising a parallel train of two chemical facilities, each including at least one steam cracker furnace. The system further comprises a model of the first facility, a first fluid flow into the first facility upstream of a first steam cracker furnace, a second fluid flow into the second facility upstream of a second steam cracker furnace, an interconnecting third fluid flow between an interconnector origin point in the first facility downstream of the first steam cracker furnace and upstream of at least one process unit, to an interconnector destination point in the second facility downstream of the second steam cracker furnace and upstream of at least one process unit, and a special purpose computer. The special purpose computer operates a control system to implement diverting an amount of the third fluid flow between the interconnector origin point and the interconnector destination point in order to move towards optimizing one or more parameters in at least the first facility, wherein the amount diverted is obtained using the model of the first facility.

BRIEF DESCRIPTION OF THE DRAWINGS

So that the recited features of the present invention can be understood in detail, a more particular description of the invention, briefly summarized above, can be had by reference to certain aspects, some of which are illustrated in the appended drawings. It is to be noted, however, that the appended drawings illustrate only some aspects of this invention and are therefore not to be considered limiting of its scope, for the invention can admit to other equally effective aspects.

DETAILED DESCRIPTION

Definitions

"Facility" means any facility that is adapted to refine, purify, convert, consume, or otherwise process any material to produce desired products, and includes, but is not limited to, petroleum refineries, petrochemical plants, other chemical plants (i.e., chemical plants that are not based on petrochemicals), facilities for converting natural gas and/or methanol into other hydrocarbons, natural gas liquefaction plants, polymers and plastics plants, steel mills, pharmaceutical manufacturing plants, and electric power generating plants.

"Gas oil" means a liquid, hydrocarbon-containing distillate, wherein more than 5.0 wt. % of the distillate has an atmospheric boiling point >260° C., the boiling range being measured in accordance with ASTM Standard D86, and the weight percent being based on the weight of the distillate.

"Intermediate stream" or "intermediate fluid flow" means a process stream within a facility that is downstream of at least one process unit and upstream of at least one process unit.

"Kickback loop" means a recycling loop which, when activated, comprises recycling a compressed stream to a location upstream of a compression stage in a cracked gas compressor in order to maintain a specified minimum volumetric flow rate through the compression stage.

"Naphtha" means a mixture comprising ≥75.0 wt. % of molecules containing hydrogen and carbon, with not less than 10.0 wt. % of which mixture having an atmospheric boiling point <175° C. and not less than 95.0 wt. % of which mixture having an atmospheric boiling point ≤260° C., wherein the boiling ranges are measured in accordance with ASTM Standard D86 and the weight percents are based on the weight of the mixture.

"Process unit" means an apparatus or the equipment that performs a specific function, such as a cracked gas compressor unit, or a refrigeration unit, and a "section" of process units is a grouping of two or more associated process units, such as the recovery section of a steam cracker.

"Parallel train" means an assembly of two or more separate facilities in which the facilities include predominantly similar process unit configurations and are adapted to produce predominantly similar products. For instance, a parallel train may refer to an assembly of multiple steam cracking facilities each adapted for the production of ethylene.

Certain aspects of the invention will now be described in more detail. Although the following description relates to particular aspects, those skilled in the art will appreciate that these are exemplary only, and that the invention can be practiced in other ways. References to the "invention" may refer to one or more, but not necessarily all, of the inventions defined by the claims. The use of headings is solely for convenience, and these should not be interpreted as limiting the scope of the invention to particular aspects.

Certain aspects relate to optimizing a parallel train comprising first and second steam cracking facilities, each being operated for the production of a cracked product comprising ethylene. It has been observed that the throughput of a steam cracking facility, such as the first steam cracking facility, is periodically reduced whenever one or more steam cracker furnaces in the facility are taken offline, e.g., to remove coke buildup. It has also been observed that removing from steam cracking serving one or more furnaces in the first steam cracking facility typically results in a decrease in the facility's energy efficiency, leading to a decrease in energy efficiency for the parallel train. Certain aspects of the invention are based on the discovery that this difficulty can be at least partially overcome when the second facility is operated under conditions which permit the withdrawal of a portion of the second facility's cracked product with little or no loss in the second facility's energy efficiency. Under these conditions, a portion of the second facility's cracked product can be transferred away from the second facility and combined with at least a portion of the first facility's cracked product. It has been found that for a broad range of operating conditions of the first and second facilities, such a transfer restores at least a part of the first facility's energy efficiency with little or no decrease in the total energy efficiency of the second facility and, more particularly, with an increase in the parallel train's energy efficiency to a value that approaches or even exceeds the energy efficiency obtained before removal of the first facility's furnace from steam cracking service.

The invention is not limited to a parallel train of steam cracking facilities, but is broadly applicable to the parallel operation of a wide variety of processes such as one or more processes for the production, processing, and transportation of solid, liquid, and/or gaseous materials. Such processes include chemical and/or petrochemical processes; energy production and/or conversion processes; and/or materials synthesis and modification processes. For convenience, the invention will now be more particularly described with respect to a parallel train of steam cracking facilities. The invention is not limited to these aspects, and this description is not meant to foreclose other aspects within the broader scope of the invention, such as those where the parallel train comprises more than two facilities, and/or where the parallel train includes processes other than steam cracking. Such processes can include, e.g., one or more of alcohol conversion, fixed bed catalytic cracking, fluidized catalytic cracking, thermal cracking other than steam cracking, and/or coking facilities.

In certain embodiments, the first facility in the parallel train comprises n total process units, wherein n is a whole number greater than or equal to 0, and the second facility in the parallel train comprises m total process units, wherein m is a whole number greater than or equal to 0. An exemplary parallel train of first and second steam cracking facilities is illustrated schematically in FIG. 1. A first steam cracking facility 100 includes a first furnace section 101 and a first recovery section 102. A first steam cracking facility 200 includes a second furnace section 201 and a second recovery section 202. Although the first and second facilities can be located at or proximate to a petroleum, chemical, or petrochemical manufacturing plant, this is not required. In certain aspects the first facility is located at or proximate to a first manufacturing plant and the second facility (i) operates in parallel with the first facility and (ii) is located proximate to a second manufacturing plant. The facilities operate in parallel in the sense of having congruent operating features, but not necessarily the same directional orientation. A first feed is conducted via line 110 to furnace section 101 of facility 100, and a second feed is conducted via line 210 to furnace section 201 of facility 200. The first and second feeds will now be described in more detail. The invention is not limited to these feeds, and this description is not meant to foreclose other feeds within the broader scope of the invention.

First and Second Feeds

The first feed typically comprises ≥50 wt. % hydrocarbon, e.g., ≥75 wt. %, such as ≥90 wt. %. For example the first feed can comprise relatively high molecular weight hydrocarbons ("Heavy Feedstocks"), such as those which produce a relatively large amount of steam cracker tar (SCT) during steam cracking. Examples of Heavy Feedstocks include one or more of steam cracked gas oil and residues, gas oils, heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, virgin naphtha, crude oil, atmospheric pipestill bottoms, vacuum pipestill streams including bottoms, wide boiling range naphtha to gas oil condensates, heavy non-virgin hydrocarbon streams from refineries, vacuum gas oils, heavy gas oil, naphtha contaminated with crude, atmospheric residue, heavy residue, $C_4$/residue admixture, naphtha/residue admixture, and gas oil/residue admixture. The Heavy Feedstock can have a nominal final boiling point of at least about 600° F. (315° C.), generally greater than about 950° F. (510° C.), typically greater than about 1100° F. (590° C.), for example greater than about 1400° F. (760° C.). Nominal final boiling point means the temperature at which 99.5 wt. % of a particular sample has reached its boiling point. Certain Heavy Feedstocks comprise at least one residue of crude oil upgrading ("resid"), e.g., a non-boiling residue of crude oil fractionation. Heavy Feedstock can comprise a significant amount of resid, e.g., ≥1 wt. % resid based on the weight of the Heavy Feedstock, such as ≥10 wt. %. Resid typically comprises asphaltenes, e.g., ≥50 wt. % based on the weight of the resid. A particular Heavy Feedstock comprises ≥0.1 wt. % asphaltenes based on the weight of the feed hydrocarbon, e.g., ≥5 wt. %.

Instead of or in addition to Heavy Feedstock, the first feed can comprise one or more relatively low molecular weight hydrocarbon ("Light Feedstocks"), particularly those embodiments where relatively high yields of $C_2$ unsaturates (ethylene and acetylene) are desired. Light Feedstocks typically include substantially saturated hydrocarbon molecules having fewer than five carbon atoms, e.g., ethane, propane, and mixtures thereof.

The Light Feedstock can be one that is primarily in the vapor phase at a temperature of 15° C. and a pressure of 1 bar. For example, the first hydrocarbon feed can comprise about 20.0 wt. % to 80.0 wt. % of ethane, based on the weight of the feed, with ≥90 wt. % of the balance of the first feed comprising propane, such as with ≥95 wt. %, or with ≥99 wt. %. In other aspects, the Light Feedstock is primarily in the liquid phase under those conditions. For example, the first feed can comprise ≥1.0 wt. % of liquid phase hydrocarbons, based on the weight of the first feed, such as ≥25.0 wt. %. One suitable feed that is primarily in the liquid phase comprises ≥50.0 wt. %, e.g., ≥75.0 wt. %, such as ≥90.0 wt. % of naphtha.

The second feed can be selected from among the same feeds as specified for the first feed. Although the second feed's composition can be substantially the same as that of the first feed, this is not required. For example, when the first feed comprises a majority of one or more of the specified Heavy Feedstocks, the second feed can comprise (i) substantially the same Heavy Feedstock(s) as the first feed, and in substantially the same relative amounts; (ii) substantially the same Heavy Feedstock(s) as the first feed, but in different relative amounts than the first feed; (iii) a major amount of one or more Light Feedstocks; and (iv) hydrocarbon comprising ≤1 wt. % of Light Feedstock and/or ≤1 wt. % of Heavy Feedstock. Alternatively, when the first feed comprises a major amount of one or more of the specified Light Feedstocks, the second feed can comprise (i) substantially the same Light Feedstock(s) as the first feed, and in substantially the same relative amounts; (ii) substantially the same Light Feedstock(s) as the first feed, but in different relative amounts than the first feed; (iii) a major amount of one or more Heavy Feedstocks; and (iv) hydrocarbon comprising ≤1 wt. % of Light Feedstock and/or ≤1 wt. % of Heavy Feedstock. In particular aspects, the first feed comprises a major amount of crude oil, and the second feed comprises a major amount of naphtha (or vice versa).

Figure 1:
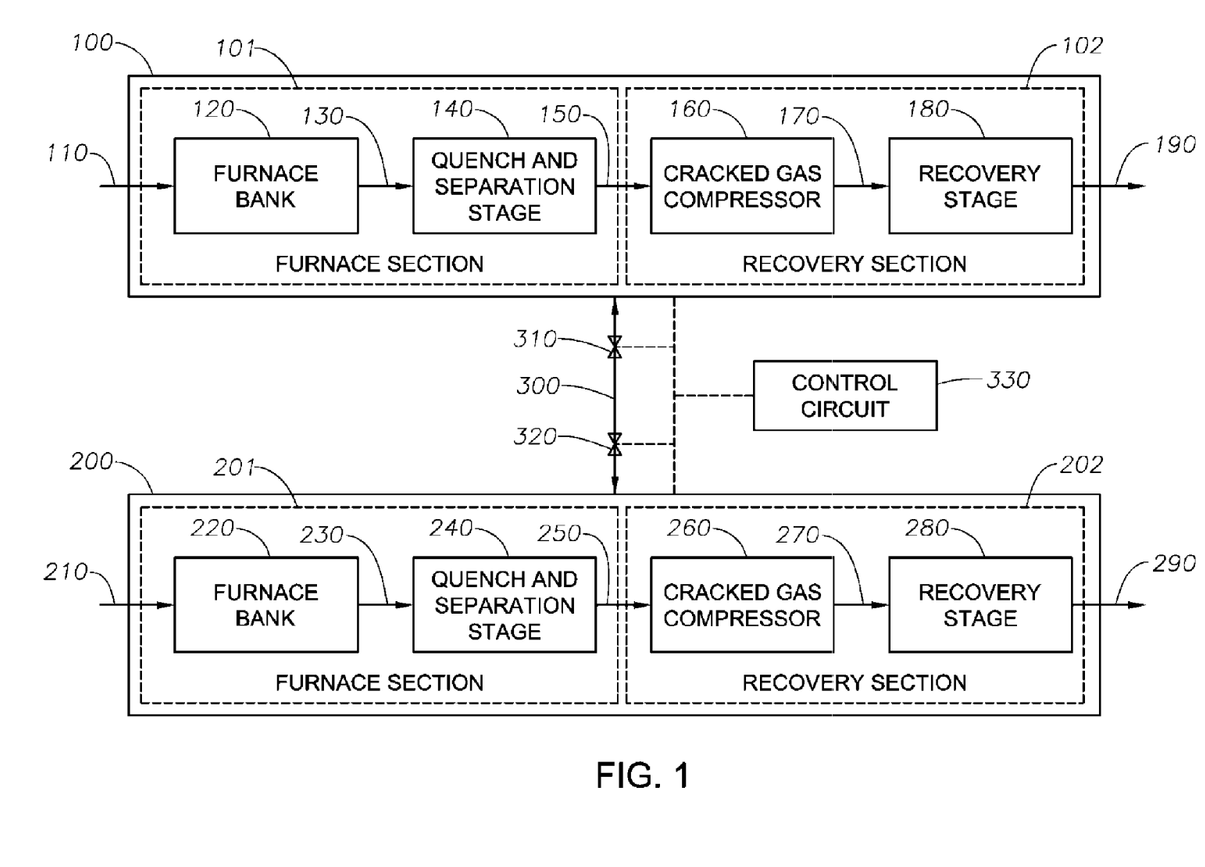
FIG. 1 depicts a schematic representation of a parallel train comprising two steam cracking pyrolysis facilities for the production of ethylene.

As shown in FIG. 1, the specified first feed 110 is conducted to furnace bank 120 of a first steam cracking facility ("steam cracker") 100 and the specified second feed 210 is conducted to furnace bank 220 of a second steam cracker 200. Certain features of the first and second steam crackers will now be described in more detail. The invention is not limited to steam crackers having these features, and this description is not meant to foreclose other forms of steam cracking within the broader scope of the invention.

Steam Cracking—Furnace Section

Continuing with reference to FIG. 1, feeds 110 and 210 are transferred to furnace sections 101 and 201. A furnace section includes at least one furnace for exposing a hydrocarbon-containing feed to pyrolysis conditions in the presence of steam to produce a furnace effluent comprising unreacted steam, unreacted feed, $C_2$-$C_4$ unsaturated hydrocarbon, $C_4$- saturated hydrocarbon, $C_{5+}$ hydrocarbon, and heteroatom compounds such as CO and/or $CO_2$. Typically, at least one of furnace sections 101 and 202 includes a plurality of furnaces (Furnace Banks 120 and 220, as shown in FIG. 1), with each furnace in the bank operating in parallel. Typically, each furnace bank will include between five and fifteen furnaces. A furnace bank can be subdivided into individual furnaces or sets of furnaces. A furnace set typically includes those furnaces in the bank which have similar steam cracking characteristics and/or those configured for receiving similar feeds.

A steam cracker furnace typically comprises a radiant zone and a convection zone. The radiant zone typically includes at least one fired heater (e.g., a plurality of burners) and at least one radiant tube. The convection zone typically includes at least one convection tube and mixing means (e.g., at least one sparger) for combining the furnace's feed with steam. Cross-over piping connects the downstream end of the convection tube(s) with the upstream end of the radiant tube(s). Part of the heat from the fired heater(s) is radiantly transferred to the radiant tubes. Another part of the heat produced by the fired heaters resides in a flue gas, which exits the radiant zone, is conducted through the convection zone, and is then conducted away from the process. Heat is convectively transferred from the flue gas to the convection tubes. Furnaces typically include a plurality of convection tubes, generally arranged in at least one coil bank for parallel flow of hydrocarbon feedstock. Similarly, the radiant tubes are typically arranged in at least one coil bank for parallel flow of convection zone effluent through the radiant zone.

Optionally, one or more steam cracker furnaces in each of furnace banks 120 and 220 is integrated with at least one vapor/liquid separation device (conventionally referred to as a flash pot or flash drum), for upgrading the steam cracker feed or the feed-diluent mixture. Such vapor/liquid separator devices are particularly suitable for cracking Heavy Feedstocks, such as those comprising resid, and more particularly, those comprising asphaltenes. Conventional vapor/liquid separation devices can be utilized to do this, though the invention is not limited thereto. Examples of such conventional vapor/liquid separation devices include those disclosed in U.S. Pat. Nos. 7,138,047; 7,090,765; 7,097,758; 7,820,035; 7,311,746; 7,220,887; 7,244,871; 7,247,765; 7,351,872; 7,297,833; 7,488,459; 7,312,371; and 7,235,705, which are incorporated by reference herein in their entirety. Suitable vapor/liquid separation devices are also disclosed in U.S. Pat. Nos. 6,632,351 and 7,578,929, which are incorporated by reference herein in their entirety. Generally, when using a vapor/liquid separation device, the composition of the vapor phase leaving the device is substantially the same as the composition of the vapor phase entering the device, and likewise the composition of the liquid phase leaving the device is substantially the same as the composition of the liquid phase entering the device, i.e., the separation in the vapor/liquid separation device consists essentially of a physical separation of the two phases entering the separation device.

One problem frequently encountered during steam cracking is that carbonaceous deposits (coke) accumulates on the inner surfaces of the convection tubes, cross-over piping, and radiant tubes. Coke detrimentally increases pressure drop across the tubes and inhibits efficient heat transfer to the hydrocarbon-steam mixture in the tubes' interior. To remedy this, one or more furnaces in furnace banks 120 and 220 are periodically removed from steam cracking service for decoking. During decoking mode, the flow of hydrocarbon feed to the furnace is curtailed or halted, and a flow of decoking fluid is initiated into the furnace's convection tubes and/or radiant tubes. The decoking fluid, which typically comprises steam and air, reacts with and removes at least a portion of the coke that was deposited in the tubes and/or cross-over piping during steam cracking mode. Decoking mode continues (during a decoking interval), until a desired amount of the accumulated coke has been removed from the inner surfaces of the furnace tubes. After the decoking interval, the furnace can be returned to steam cracking mode.

Another problem encountered during steam cracking is radiant tube embrittlement, resulting at least in part from carburization reactions which occur during steam cracking mode. To remedy this, furnaces are typically taken off-line for a maintenance interval that is of considerably greater duration (e.g., typically more than one week) than the decoking interval (typically less than one day). Embrittled furnace tubes are typically replaced during the maintenance interval.

In each of furnace banks 120 and 220 the plurality of steam cracker furnaces may be operated (i) in parallel, where a portion of the feed is transferred to each of the plurality of furnaces and/or (ii) in series, where at least a second furnace is located downstream of a first furnace, the second furnace being utilized for cracking unreacted pyrolysis feedstock components in the first furnace's pyrolysis effluent. The invention will be more particularly described with respect to furnace banks having at least one furnace, but more typically a plurality of furnaces operating in parallel. The invention is not limited to furnace sections having this configuration. Accordingly, feeds 110 and 210 are configured so that a portion of each feed can be transferred into the upstream end of the convection tube(s) of each furnace in the bank. The feed is heated in the convection zone, e.g., by (i) the steam added via the mixing means and (ii) the convective heat transfer. Feed that is not in the vapor phase when it enters the convection tube(s) is at least partially vaporized in the convection zone, typically in the mixing means and/or the convection tube(s). Heated, vapor-phase feed exits the downstream end of the convection tube(s), traverses the cross-over piping, and then enters the radiant tube(s). The heated, vapor-phase feed is exposed to pyrolysis conditions within the radiant tube(s) for a time sufficient to produce the desired furnace effluent. Effluent from each furnace in furnace banks 120 and 220 is conducted away from the downstream end of the radiant tube(s) for quenching and separation.

Effluents from each furnace in bank 120 are combined to produce a first combined effluent, which is conducted via line 130 to quench/separation stage 140. Similarly, effluents from each furnace in bank 220 are combined to produce a second combined effluent, which is conducted via line 230 to quench/separation stage 240. Optionally, effluent from each furnace is subjected to an initial quench (not shown) at a location upstream of stages 140, 240, e.g., before the furnace effluents are combined. Stages 140 and 240 typically include quenching means, e.g., one or more quench towers (not shown) and separation means, e.g., one or more primary fractionators (not shown). Following quenching, stages 140 and 240 are utilized for separating from the quenched effluents one or more of steam cracker naphtha, steam cracker gas oil, water, and any steam cracker tar. What remains of the quenched effluents following these separations is typically called "cracked gas", although it can also include un-cracked feed components. The cracked gas is primarily in the vapor-phase, and includes $C_1$-$C_5$ hydrocarbon and heteroatom compounds such as CO and/or $CO_2$. A first cracked gas is conducted away from stage 240 via line 250 to recovery section 202. Conventional separation equipment can be utilized in the separation stages, e.g., one or more flash drums, fractionators, water-quench towers, indirect condensers, etc., such as those described in U.S. Pat. No. 8,038,931.

Feeds 110 and 210 can each comprise a plurality of feed constituents, e.g., a Light Hydrocarbon constituent and a Heavy Hydrocarbon constituent. The feed constituents can be combined upstream of furnace banks 120 and 220, but this is not required. For example, lines 110 and/or 210 can each comprise a plurality of conduits (not shown in FIG. 1) for conveying individual feed constituents to furnace banks 120 and/or 220. When first and second feed constituents are conveyed to one bank of furnaces, the first constituent can be conducted to a first furnace or set of furnaces of the bank, with the second constituent being conveyed to a second furnace or set of furnaces. When a furnace section includes a plurality of furnace banks, e.g., first and second furnace banks, the first bank can be configured to steam crack a first feed constituent, with the second bank being configured to steam crack a second feed constituent. The first feed constituent can comprise, e.g., one or more Light Feedstocks, such as ethane, with the second feed constituent comprising, e.g., one or more Heavy Feedstocks, such as crude oil. Alternatively, the first feed constituent can comprise crude oil, with the second feed constituent comprising naphtha.

In particular aspects, one or more furnace banks, one or more sets of furnaces included in a furnace bank, and/or one or more individual furnaces (whether stand-alone or included in a furnace bank) can be configured to be "feed-flexible", i.e. capable of steam cracking a plurality of feed compositions or constituents thereof. For example, a furnace bank may include one or more furnaces which are configured to steam crack Light Feedstocks and/or Heavy Feedstocks, such as when the Light Feedstock is transferred to designated furnace(s) for a first time interval and the Heavy Feedstock is transferred to the designated furnaces during a second time interval. The first and second interval can be overlapping time intervals, but are typically substantially non-overlapping. As shown schematically in FIG. 2, furnace bank 120 may comprise furnaces 121, 123, and 125. Furnace 121 is configured to receive a first constituent of the first feed via conduit 110a, where the first feed constituent comprises naphtha. Furnace 125 is configured to receive a second constituent of the first feed via conduit 110b, where the second constitute comprises crude oil. Furnace 123 is configured to receive the first and/or second constituents via conduit 110c, e.g., the furnace can receive naphtha during a first time interval (solid line) and crude oil during a second time interval (broken line). Feed constituent flow can be controlled by flow-control means, such as valves $V_1$ and $V_2$.

Figure 2:
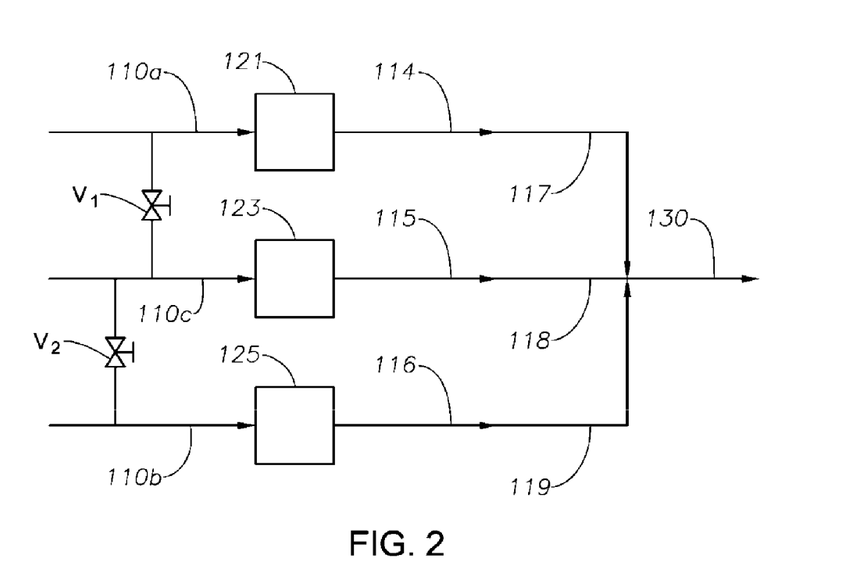
FIG. 2 depicts a schematic representation of a pyrolysis furnace bank in a steam cracking facility.

Continuing with reference to FIG. 2, a crude oil stream is conducted via conduit 110c to furnace bank 120 in parallel with a naphtha stream conducted via conduit 110a. Valves $V_1$ and $V_2$ are configured to transfer a first portion of the naphtha via conduit 110a to furnace 121. Steam cracking carried out in furnace 121 produces a furnace effluent, which is conducted away via conduit 114. A second portion of the naphtha is conducted to furnace 123 via conduit 110c. Furnace 123 steam cracks at least a portion of the naphtha to produce a second furnace effluent, which is conducted away via line 115. At least a portion of crude oil conveyed in conduit 110b is steam cracked in furnace 125 to produce a third furnace effluent, which is conducted away via conduit 116. The furnace effluents of conduits 114, 115, and 116 are combined to form a combined effluent, which is conducted away from the furnace bank via conduit 130.

Steam Cracking—Recovery Section

Returning to FIG. 1, cracked gas is conducted via lines 150 and 250 to recovery sections 102 and 202 for separation and recovery from the cracked gas of one or more desired products such as ethylene and/or propylene. To facilitate the separations and recovery, the cracked gas is typically compressed in one or more cracked gas compressors (CGCs) located in the recovery section. A CGC typically includes a plurality of compression stages operating in series which gradually increase the cracked gas's pressure. A typical CGC includes three to five compression stages. Accordingly, as shown schematically in FIG. 1, cracked gas is conducted via lines 150 and 250 to CGCs 160 and 260 to form compressed cracked gas, which is conducted away from the CGC stages via conduits 170 and 270.

It is desired to configure the CGC so that it can continue to operate when (i) one or more feed-flexible furnaces is switched from a feed which produces a greater amount of cracked gas to a feed which produces a lesser amount, or vice versa, (ii) one or more furnaces is operating in decoking mode, or (iii) one or more furnaces is in a maintenance interval. Since compressor damage can occur during intervals of decreased cracked gas flow, CGCs are typically equipped with at least one recycle loop (referred to as a "kickback loop"). During periods of decreased cracked gas flow, compressed gas from the outlet of at least one higher-pressure CGC stage is conducted upstream, where it is introduced into the inlet of a lower-pressure CGC stage. Doing so maintains a cracked gas flow rate that is greater than a minimum value needed in one or more compression stages encompassed by the kickback loop.

Figure 3:
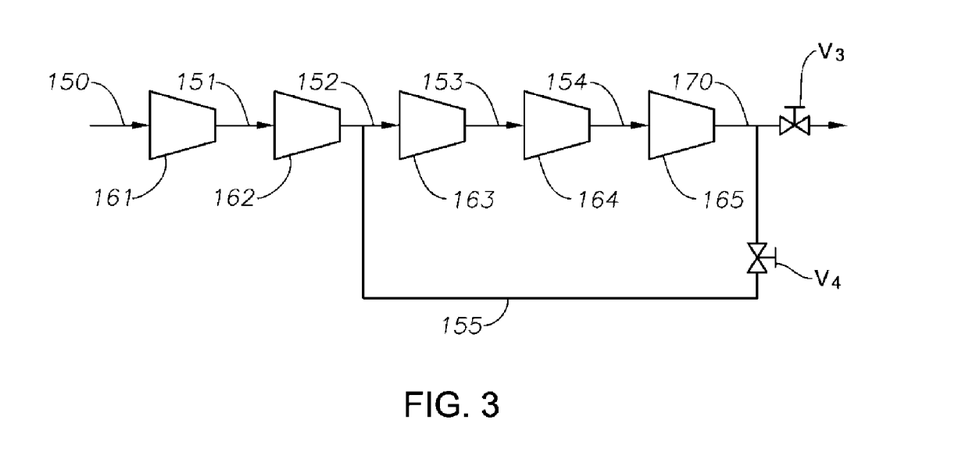
FIG. 3 depicts a schematic representation of a cracked gas compressor in a steam cracking facility.

An example of a CGC which includes a kickback loop is shown schematically in FIG. 3. CGC 160 includes a first compression stage 161, line 151 for conveying a first compressed stream, a second compression stage 162, line 152 for conveying a second compressed stream, a third compression stage 163, line 153 for conveying a third compressed stream, a fourth compression stage 164, line 154 for conveying a fourth compressed stream, a fifth compression stage 165, and line 170 for conveying a Compressed cracked gas away from the CGC. At least a portion of the Compressed cracked gas is conducted to recovery stage 180. When needed to maintain cracked gas flow in one or more of stages 163, 164, and 165, a second portion of the compressed cracked gas is conducted via kickback loop 155 to line 152, where the second portion is combined with the second compressed stream. Valve means, e.g., valves $V_3$ and $V_4$ can be used to adjust the relative amounts of the first and second compressed cracked gas portions. Pressure reducing means, e.g., one or more turbo-expanders (not shown) can be used to regulate pressure within the kickback loop if needed. It should be apparent to those skilled in the art that although it lessens the risk of CGC failure, utilizing such a kickback loop can result in a decrease in the steam cracker's energy efficiency.

Returning again to FIG. 1, compressed cracked gas is conducted via lines 170 and 270 to recovery stages 180 and 280 to form upgraded effluent streams 190 and 290. The recovery stage may include an amine wash unit for removing acidic gases such as $H_2S$ and $CO_2$. When an undesirable amount of acidic gases remains in the amine-treated compressed cracked gas, caustic extraction can be utilized to remove at least a portion of the remainder. This is typically the case for steam crackers utilizing a feed containing Heavy Feedstock, such as crude oil, which may contain ≥0.1 wt. % sulfur. An example of upgrading the compressed cracked gas with amine contacting and caustic extraction is shown schematically in FIG. 5, where recovery stage 180 utilizes a lean aqueous amine mixture that is conducted via line 181 to amine contactor 182. Compressed cracked gas contacts and combines with the lean aqueous amine mixture in the amine contactor. At least a portion of the compressed cracked gas's acidic gases, e.g., $H_2S$ and/or $CO_2$ are removed from the compressed cracked gas in unit 182, and an amine-treated cracked gas is conducted away from unit 182 via line 183. The amine-treated cracked gas contains a lesser concentration of $H_2S$ and/or $CO_2$ than does the compressed cracked gas, such as 50% less $H_2S$ and/or $CO_2$, or 75% less, or 90% less (on a weight basis). The transfer of $H_2S$ and/or $CO_2$ (including any ionized fragments thereof) from the compressed cracked gas to the aqueous amine mixture in stage 182, produces a rich aqueous amine mixture that is conducted away via line 184.

Figure 5:
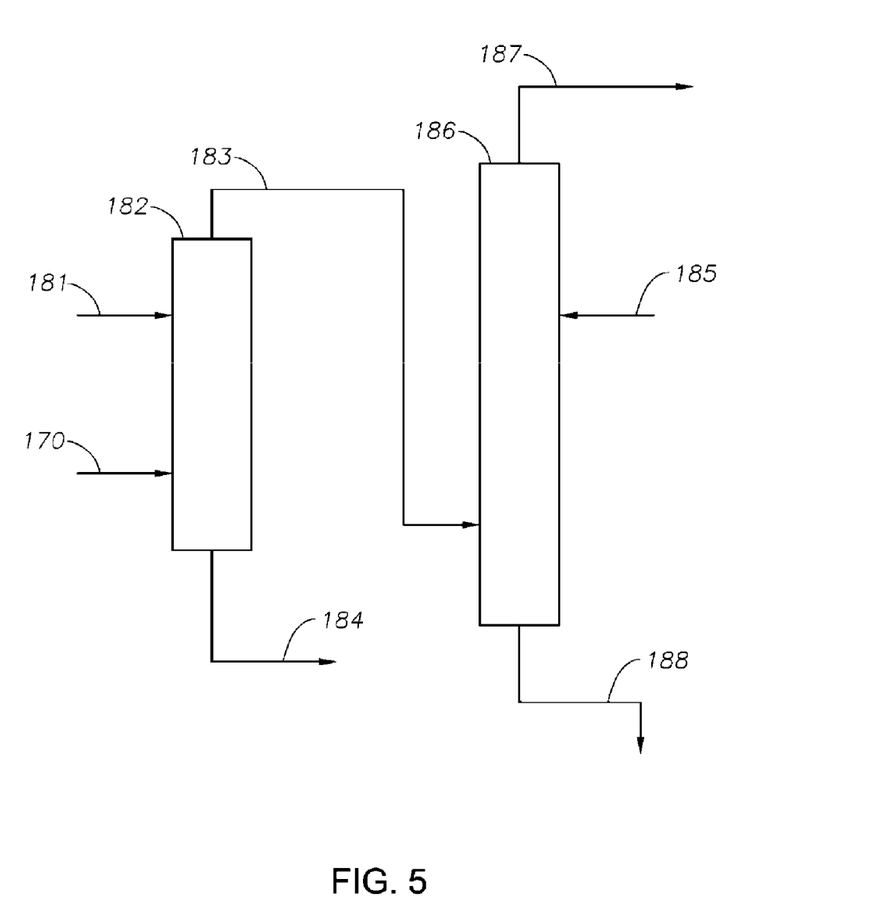
FIG. 5 depicts a schematic representation of a recovery stage in a steam cracking facility.

The amine-treated cracked gas is then conducted via line 183 to caustic extractor 186. A lean caustic stream is conducted to the caustic extractor via line 185. A rich caustic stream (enriched with extracted $H_2S$, $CO_2$ or derivatives thereof) is conducted away from the caustic extractor via line 188. A caustic-treated cracked gas is conducted away from the caustic extractor via line 187. The rich caustic stream can be regenerated to produce lean caustic, which can be re-used.

Interconnecting Stream

Those skilled in the art will appreciate that operation of the parallel train illustrated in FIG. 1 can be carried out with improved effectiveness by optimizing parameters such as cost, product yield, profit margin, and energy efficiency. The optimization can be applied in the steady state and/or in response to a deviation from desired operation. The optimization can be applied to one or more of (i) the parallel train as a whole, (ii) to parallel train components such as facilities 100 and/or 200, (iii) to one or more stages within these facilities, and (iv) to one or more components of these stages. Certain aspects of the invention relate to improving the parallel train's energy efficiency and/or optimizing process unit capacity utilization by conducting an interconnecting stream between facilities 100 and 200 via line 300, wherein the interconnecting stream comprises a partially withdrawn intermediate stream from one of facilities 100 and 200 that is then added to the other facility. Certain aspects which include such a transfer will now be described in more detail.

Particular aspects of the invention relate to a deviation from desired parallel train operation resulting from a decrease in cracked gas flow in conduit 150 to CGC 160. Such a flow decrease can arise, e.g., when (i) one or more feed-flexible furnaces in furnace bank 120 is switched from a Light Hydrocarbon feed to a Heavy Hydrocarbon feed, (ii) one or more furnaces in furnace bank 120 are in decoking mode, or (iii) one or more furnaces in furnace bank 120 are in a maintenance interval. To prevent damage to CGC 160 that may otherwise result from decrease cracked gas flow, a flow of compressed cracked gas is established in the kickback loop illustrated in FIG. 3. Since the kickback loop includes recycling and recompressing the kickback portion of the cracked gas, establishing cracked gas flow in the kickback loop results in a loss of energy efficiency in facility 100. It has been found that this difficulty can be at least partially overcome by establishing or increasing a flow of additional cracked gas to CGC 160, the additional cracked gas being obtained by diverting a portion of the cracked gas of facility 200, e.g., a portion of the cracked gas in conduit 250. The diverted cracked gas is transferred via conduit 300 to facility 100, e.g., to conduit 150, in order to at least partially obviate the need for establishing kickback flow in CGC 160. As an added effect of this stream transferal, the process units downstream of the stream withdrawal in facility 200 receive less fluid flow. That is, the capacity utilization of these process units is decreased. Thus, in such aspects, the parallel train's process unit capacity utilization can also be improved along with its energy efficiency by increasing the feed flow rate to facility 200 and thereby increasing the fluid flow to these downstream process units. Ideally, as a result of this stream transferal, in the event that at least one steam cracker furnace in the first facility is taken offline the facilities are capable of producing at least 90% of the total amount of ethylene produced before the furnace was taken offline, and, in addition, no kickback loop is activated.

Other aspects of the invention relate to a deviation from desired parallel train operation resulting from an increased acid gas concentration in the cracked gas of facility 200, particularly in aspects where recovery stage 280 contains an amine contactor but does not contain a caustic extractor. Such an acid gas concentration increase can occur, e.g., by substituting in conduit 210 a liquid feed having a greater sulfur content (e.g., naphtha) for a gaseous hydrocarbon feed (e.g., ethane) having a lesser sulfur content. This substitution is observed to increase $H_2S$ concentration in the compressed cracked gas of conduit 270. Since stage 280 lacks a caustic extractor, an undesirable amount of acidic gas is retained in amine-treated cracked gas. This retained acidic gas leads to increased equipment corrosion and a decrease in the amount of hydraulic capacity of separation units downstream of the amine contactor that is available for olefin separation. It has been found that this difficulty can be at least partially overcome by diverting a portion of the cracked gas of facility 200, e.g., a portion of the compressed cracked gas in conduit 270. The diverted cracked gas is transferred via conduit 300 to facility 100, e.g., to conduit 170. The diverted cracked gas can then be exposed to amine treating and caustic extraction in recovery section 180. The diversion decreases acid gas concentration in the amine-treated cracked gas of stage 280 with little or no increase in acid gas concentration in the caustic-treated cracked gas of stage 180. When the diversion is carried out by transferring via conduit 300 a portion of the compressed cracked gas of conduit 270 to conduit 170, flow of cracked gas through CGC 260 is maintained with little or no need for establishing an energy-inefficient kickback flow in that CGC.

Yet other aspects of the invention relate to optimizing the parallel train whenever the two facilities have differing feed capabilities, particularly when facility 200 is capable of processing a higher profit margin feed stream from facility 100. In such aspects, it may be advantageous to increase the amount of the higher profit margin feed stream, e.g., naphtha, in conduit 210 to an amount resulting in a cracked gas effluent exceeding the downstream processing capabilities of this facility. For instance, increasing naphtha in conduit 210 could increase the acid gas concentration in conduit 270 beyond the acid gas removal capabilities of recovery stage 280. It has been found that this difficulty can be at least partially overcome by diverting a portion of the cracked gas of facility 200, e.g., a portion of the compressed cracked gas in conduit 270. The diverted cracked gas is transferred via conduit 300 to facility 100, e.g., to conduit 170. The diverted cracked gas can then be exposed to amine treating and caustic extraction in recovery section 180. In order to accommodate the diverted cracked gas from facility 200 in recovery section 180, the amount of at least one feed stream in the second feed to furnace bank 120 may optionally be decreased so that the total amount of cracked gas conducted to recovery section 180 is maintained relatively unchanged.

Aspects of the invention will now be described in more detail, these aspects relating to establishing or increasing a cracked gas flow in conduit 300 in response to a decrease in cracked gas flow in conduit 150 to CGC 160. The invention is not limited to these aspects, and this description is not meant to foreclose other aspects within the broader scope of the invention. With continuing reference to FIG. 1, one or more of the plurality of steam cracker furnaces in furnace bank 120 is taken offline, e.g., for decoking, and an interconnecting stream conducted via line 300 is to lessen the deviation from an optimal range of energy efficiency for the parallel train.

In taking one or more furnaces in furnace bank 120 offline, the volumetric flow rate of the cracked gas conducted via line 150 to CGC 160 is reduced. As shown schematically in FIG. 4, the energy efficiency of a CGC is a function of total volumetric flow rate, i.e., capacity, through at least one of the plurality of compression stages. Those skilled in the art will appreciate that this functional relationship is readily available or can be determined with reference to manufacturer-provided compressor curves for a particular CGC. The maximum energy efficiency of a CGC corresponds to the capacity which uses the least energy per unit of fluid (denoted by dashed line b in FIG. 4). The CGC rapidly loses energy efficiency at lesser volumetric flow rates because a kickback loop must be implemented which entails recompressing recycled gas that has already been at least partially compressed. Thus, in taking a furnace offline, the energy efficiency of CGC 160 would drastically decrease if the implementation of a kickback loop would be necessary.

Figure 4:
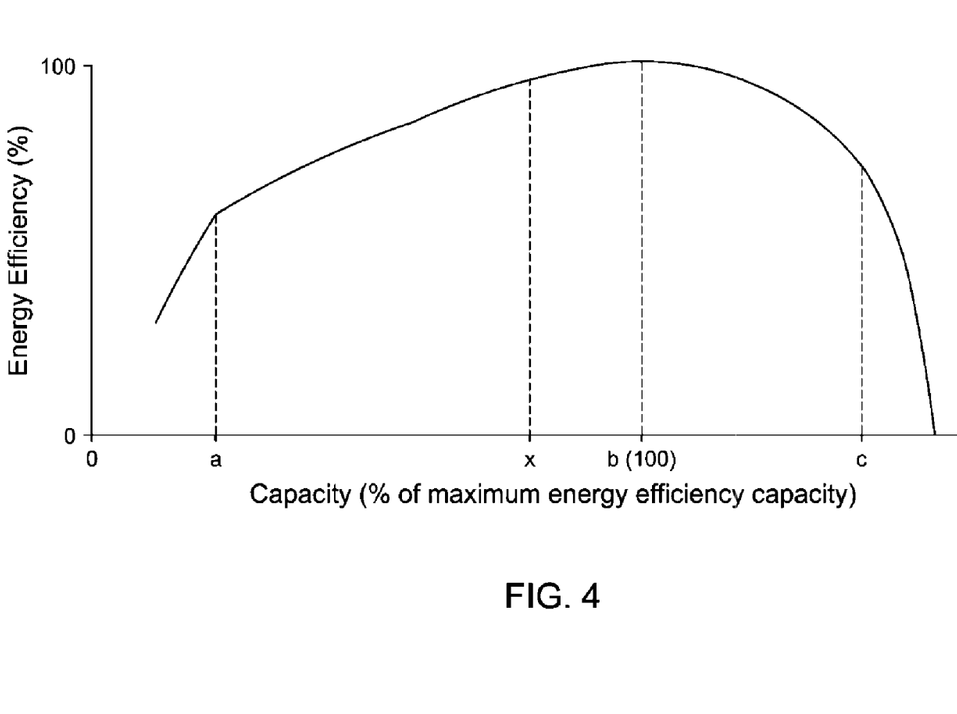
FIG. 4 depicts a schematic representation of the energy efficiency of a cracked gas compressor as a function of capacity.

Surprisingly, it has been found that for typical CGCs used in steam cracking recovery stages, the energy efficiency of a CGC exhibits a surprisingly broad maximum within a certain capacity range, such as between approximately 50% and 120% of the CGC's maximum energy efficiency capacity. Away from this broad maximum, there is a rapid decrease in CGC energy efficiency as cracked gas flow is (i) increased, e.g., as a result of turbulence, etc. as the fluid approaches sonic velocity (i.e., "stonewall") or (ii) decreased, e.g., as a result of an increase in kickback flow. As can be seen in FIG. 4, the steepness of the decline in the energy efficiency curve is relatively constant at low capacities as a result of kickback flow, while it continually increases as stonewall is approached. The broad energy maximum capacity range is thus defined for purposes of this invention as ranging from the capacity at which kickback flow is no longer implemented (denoted by dashed line a in FIG. 4) to the capacity at which the steepness of the decline in the energy efficiency curve is approximately equal to the steepness in the decline at low capacities as a result of kickback flow (denoted by dashed line c in FIG. 4). This broad maximum range is significant, as it allows for the partial withdrawal of cracked gas from facility 200 while maintaining CGC 260 within the maximum range. In other words, cracked gas can be withdrawn from facility 200 can be conducted via line 300 and added to the cracked gas fed to CGC 160, with little or no need for kickback flow. CGCs 160 and 260 can therefore both operate within the broad maximum range of energy efficiency.

Typically, the steady-state operating conditions for facilities 100 and 200 are selected such that the volumetric flow rate through conduits 150 and 250 corresponds to around midway within the broad energy efficiency maximum capacity range of CGCs 160 and 260, respectively (e.g, circa 85% of the maximum energy efficiency capacity of CGC 160, denoted by dashed line x in FIG. 4). Operating at these conditions provides the advantage of maximizing the amount of the interconnecting stream that may be conducted between the facilities while maintaining the volumetric flow through CGC 160 and CGC 270 broad energy efficiency maximum capacity range.

The interconnecting stream can be conducted via line 300 from a first interconnector origin point located downstream of furnace bank 120 and upstream of at least one process unit to a first interconnector destination point located downstream of furnace bank 220 and upstream of at least one process unit. In certain aspects, line 300 conveying the interconnecting stream is a physical conduit, such as piping. In these aspects, the amount of the interconnecting stream flow may be controlled at least in part by valves 310 and 320. The invention is not limited to conveying the interconnecting stream via one or more physical conduits, and in other aspects, line 300 represents, e.g., manual transportation of the interconnecting stream via one or more of truck, aircraft, train, watercraft, etc. Any suitable conveyance can be used including conventional conveyances, but the invention is not limited thereto.

Typically, the amount of flow in conduit 300 is controlled so that (i) a sufficient flow of cracked gas is provided to restore and/or maintain CGC 160 within a pre-determined broad maximum of energy efficiency and (ii) a sufficient flow of cracked gas is maintained in conduit 260 so that CGC 260 remains within a pre-determined broad maximum of energy efficiency. In certain aspects, the amount and direction of the interconnecting stream flow through line 300 is controlled by a pressure differential between valves 310 and 320. In other aspects, the amount and direction of the interconnecting stream flow through line 300 is controlled by an additional energy source, such as a centrifugal or positive displacement pump.

In certain aspects, the interconnecting stream may be configured as (i) unidirectional flow from facility 100 to facility 200, (ii) unidirectional flow from facility 200 to facility 100, or (iii) bidirectional flow from either facility 100 to facility 200 or from facility 200 to facility 100.

In certain aspects, the parallel train also comprises a second interconnecting fluid flow between a second interconnector origin point in the first facility downstream of the first interconnector end point, and a second interconnector end point located in the second facility downstream of the first interconnector origin point.

Models

Continuing with reference to FIG. 1, in certain aspects, a separate model is provided for each facility within the parallel train. In other aspects, a single model is provided for the entire parallel train. In yet other aspects, a model may be provided for one or more facilities in the parallel train and not others. For example, a model may be provided for facility 100, 200, and/or the overall parallel train.

Any model used in the invention may be either a non-linear first principles reference model, a linear programming (LP) model derived therefrom, or any combination thereof. In certain aspects, each model functions by individually modeling the various process units in a facility and then connecting the process units appropriately to reflect the overall facility/process train.

Each model includes one or more independent input variables and one or more key output variables (KOVs). The independent input variables are those input variables that can be independently controlled and that may have a significant impact on the overall performance of any process unit within the parallel train. Such independent variables can include, e.g., feed flow rates and feed compositions, (or, alternatively, flow rates for the feed component(s)), flow rates for the component(s) in all external feed streams, product flow rates, and critical operating parameters such as temperature, pressure, power, heat, boiling point, vapor fraction, and/or liquid fraction.

The KOVs are those output variables it is desired to monitor in the model, such as those output variables that directly impact the economic and/or efficiency performance of the parallel train. Illustrative KOVs include, e.g., amount of energy consumed/energy efficiency (i.e. heat, power, work), values for potential system constraints, and flow rates of the product(s). Such flow rates of the product(s) can be component flow rates or overall stream rates. In certain aspects, the KOVs include the amount of energy consumed by a CGC/energy efficiency of a CGC in at least one of the facilities. In other aspects, the KOVs include flow rates and/or compositions of acid gas streams removed in the recovery section in at least one of the facilities.

Once the input variables and KOVs are set, the model(s) can be used applying initial values for the independent input variables to determine base case values for the KOVs. To the extent that the model(s) is an accurate depicture of the process units and or facility/facilities, the base case values for the KOVs accurately predicts the actual performance of the unit(s) and/or facility/facilities at the specified input conditions.

One or more independent variables can be selected, tagged, or otherwise identified for perturbation to determine effects on downstream processes, feeds, and/or products. The model(s) use the perturbations to predict the actual performance of the unit(s) and/or facility/facilities at the specified perturbed input conditions. For example, the feed rate to one of the facilities can be reduced to simulate the effect of taking one or more steam cracker furnaces offline for decoking purposes. In certain aspects, model perturbations are used to simulate the identity, flow direction, and flow rate of the interconnecting stream. Examples of simulating stream addition or withdrawal using a linearized non-linear reference model are disclosed in U.S. Pat. Nos. 7,257,451 and 8,775,138, which are incorporated by reference herein in their entirety.

In certain aspects, the model(s) can be used to generate a set of simulations in which one or more independent variables are perturbed over a range of values. The resulting simulations can be used to select values for the one or more independent variables such that the parallel train is moved toward optimizing one or more preselected parameters.

In certain aspects, the simulations generated by any model used in the invention may be obtained via a general purpose computer, special purpose computer, manual calculation, or a combination thereof.

Control Circuit

Continuing again with reference to FIG. 1, in certain aspects the amount of the interconnecting stream conducted via line 300 and optionally a second interconnecting stream is determined by a special purpose computer 331 within computer-controlled electronic control circuit 330. In certain aspects, the special purpose computer may also be used to determine values associated with other process flow streams within the facilities, such as the amount and/or composition of the feed streams conducted via lines 110 and 210 to furnace banks 120 and 220. In certain aspects, the special purpose computer operates a control system within electronic control circuit 330 that implements the determined amount of value of each process flow stream, e.g., by operating valves $V_1$-$V_4$.

A computer-controlled electronic control circuit will now be described with particular reference to FIG. 6. The electronic control circuit 330 (introduced above in connection with FIG. 1) preferably comprises a collection of electronically controlled sensors and actuators as well as special purpose computer 331, which may be implemented by a single computer or by a system of interconnected computers (e.g., networked computers). Generally, the special purpose computer 331 has network connectivity to allow it to obtain market data used in the control algorithms. The special purpose computer may utilize control algorithms to make a determination of whether to divert flow from facility 100 to 200, or vice versa, in addition to the amount of flow that should be diverted. The algorithms take into consideration a number of measured and externally obtained data.

In certain aspects, the amount of each interconnecting stream and/or value associated with an additional process stream is determined by optimizing one or more of a plurality of parameters, or alternatively, lessening the deviation from an optimal range of one or more parameters and/or moving towards optimizing one or more parameters. In order for the special purpose computer to determine an amount of the interconnecting stream and/or value associated with an additional process stream in these aspects, at a minimum the control algorithms typically include the following inputs: (i) simulated KOVs generated by a model of at least one facility (e.g., facility 100, a model of facility 200, and/or a model of the parallel train) and (ii) any constraints on the parameter(s) to be optimized. In order for the control system operated by the special purpose computer to implement diverting the determined amount of an interconnecting stream and/or value associated with an additional process stream, the control algorithms typically include analog measured chemical process information from the facility from which the interconnecting stream is withdrawn (i.e., the originating facility) and the facility to which the interconnecting stream is added (i.e., the receiving facility).

Figure 6:
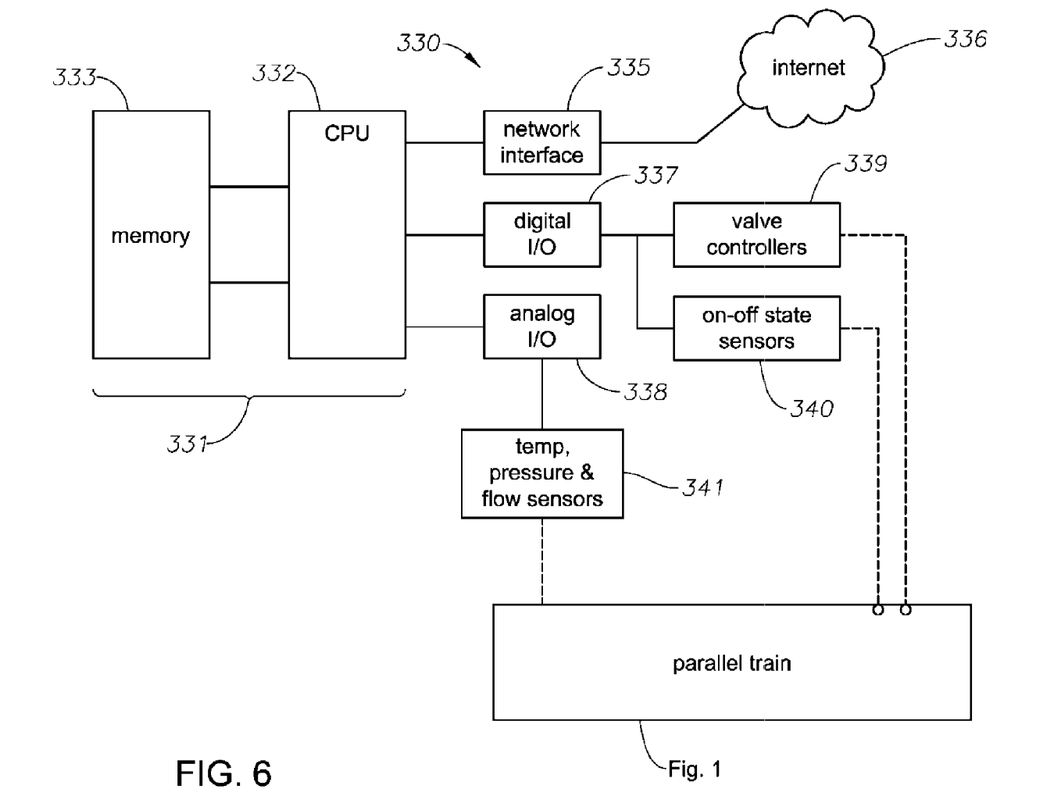
FIG. 6 depicts a schematic representation of a special purpose computer operating on a parallel train comprising two steam cracking facilities.

Referring to FIG. 6, the electronic control circuit 330, including special purpose computer 331, may be implemented by one or more processors (CPU) 332 having associated random access memory 333 attached. The random access memory serves two purposes: it stores the executable instructions that the CPU 332 operates upon to implement the algorithms described below; and it stores data operated upon by those algorithms. Attached to special purpose computer 331 is a network interface circuit 335 that provides network connectivity with data sources, such as data sources available on the internet 336. As will be described, the CPU obtains market data from the internet using this network interface. The special purpose computer 331 is also provided with a digital input/output (I/O) port 337 and an analog input/output (I/O) port 338 in order that it may operate the control system.

The method in which the special purpose computer 331 operates the control system using CPU 332, digital I/O port 337, analog I/O port 338, electronic valve controllers 339, and digital on-off state sensors 340 in order to implement the determined amount of value of each process flow stream will now be described.

The digital I/O port 337 serves as the data transmitting and receiving port by which the CPU 332 sends logic control signals to the electronic valve controllers 339 and also receives on-off state information from digital on-off state sensors 340. As illustrated diagrammatically, the valve controllers 339 provide control signals to operate one or more valves in the originating facility and one or more valves in the receiving facility (e.g., valves 310 and 320 in FIG. 1). The on-off state sensors likewise attach to these valves and provide feedback signals reporting the actual states of each valve. Feedback is provided to ensure that the actual valve states substantially correspond to the logic control signals.

The analog I/O port 338 serves as the data receiving port by which the CPU 332 receives analog chemical process information from the facilities. These data may include flow rates, temperatures, pressures, chemical concentration readings, and the like collected by temperature, pressure, and flow sensors 341. These analog data factor into the determination by the special purpose computer 331 of one or more of past values (e.g., recorded values), present values (e.g., substantially instantaneous values), future values (e.g., predicted values), accumulated values, and statistical (e.g., median, mean, and/or average) values used in determining when and how an interconnecting stream should be conducted between facilities.

In certain aspects, the computer 331 performs the control algorithms and then sends control signals to the one or more valves in the originating facility and one or more valves in the receiving facility based on the calculated results. In certain embodiments the control algorithms run continuously, so that the valve settings are adjusted in real time. In other aspects, the control algorithms run under the mediating control of a control loop, which causes the valve settings to periodically change based on measurements derived from one or more of past measurements (e.g., recorded measurements), present measurements (e.g., substantially instantaneous measurements), future measurements (e.g., predicted measurements), accumulated measurements, and statistical (e.g., median, mean, and/or average) measurements. The mediating control loop may be set by adjusting a control parameter that establishes a loop cycle time of, for example, 24 hours.

As described above, in certain aspects one or both facilities may include feed-flexible furnaces capable of steam cracking a plurality of feed compositions or constituents thereof. In such aspects, the respective instantaneous or statistical values of the feed composition and rates to the originating facility and the receiving facility can be calculated and used together with the respective instantaneous or statistical production costs to determine the feed strategy for the facilities along with the amount and direction of an interconnecting stream. To determine the instantaneous or statistical values of each feed composition to each facility, the computer 331 is programmed to obtain one or more variables that are external to the facilities, e.g., commodity market data indicating the value of naphtha, crude oil, and/or ethane on one or more commodity markets. These data may be obtained via Internet real-time commodity data sources, such as ICIS, Houston, Tex. In addition, the computer 331 is programmed to obtain commodity market data indicating the value of naphtha, crude oil, and/or ethane for use as an input to each facility. In this regard, the ethylene yield and other product mix produced by the steam cracking facility is typically highly dependent on the feed composition. For example, the ethylene yield for an ethane feed is around 80%, whereas the ethylene yield for a naphtha feed is around 30%. Thus, the market data indicating the value of each feed composition will depend on the real time and/or statistical ratio, and respective selling prices, of ethylene vs. other potential products, such as propylene. These data can be obtained via internet commodity data sources available from U.S. Energy Information Administration.

With the commodity market data for each feed composition in each facility, together with simulated KOVs generated by a model of at least one facility, computer 331 then calculates valve control parameters that are used to electronically control one or more valves in the originating facility and one or more valves in the receiving facility (e.g., valves 310 and 320 in FIG. 1).

Example

Following is an example of the use of the present invention for moving towards optimizing the overall energy efficiency and ethylene yield for a parallel train of two similar steam cracking facilities comprising the elements shown schematically in FIG. 1. In the event that the capacity of facility 100 is reduced, e.g., as a result of furnace decoking or maintenance, the CGC's kickback loop may need to be implemented to maintain a minimum flow rate through the compressor in order to avoid damage. For purposes of the example, it should be understood that simulated flow rates of a negligibly low value, e.g., 0.01 T/hr, should be treated as the equivalent of no flow. Simulating flow rates as such a low value instead of 0 is done to improve robustness of the model and aid model convergence.

First, a model is provided for each of facilities 100 and 200. The model for each facility is a non-linear first principles reference model constructed using the ROMeo® reference tool described above. The models of facilities 100 and 200 are used to determine several base case KOVs at initial steady state conditions corresponding to facilities 100 and 200 each cracking a mix of ethane/propane, naphtha, and crude oil. In particular, the models are used to determine the kickback flow rate in each facility needed to maintain the minimum flow rates to CGCs 160 and 260, the ethylene yield for each facility, the CGC power consumption of each facility, and the energy efficiency of each facility. Because of the large energy expenditures of a CGC in relation to other process units in a steam cracking facility, the energy efficiencies for facilities 100 and 200 are approximated as corresponding to the energy expenditure of CGC 160 per ton of ethylene yield and the energy expenditure of CGC 260 per ton of ethylene yield, respectively. From these results, the overall ethylene yield, CGC power consumption, and energy efficiency for the parallel train are also determined. The base case KOVs for facility 100, facility 200, and the parallel train are summarized in Table 1.

TABLE 1

| Simulated Base Case KOVs | Facility 100 | Facility 200 | Parallel Train |
|---|---|---|---|
| Kickback Flow Rate (T/hr) | 0.01 | 0.01 | — |
| Ethylene Yield (T/hr) | 93.96 | 110.00 | 203.96 |
| CGC Power Consumption (MW) | 37.92 | 49.95 | 87.87 |
| CGC Power Consumption per Ton of Ethylene Yield (MW/T) | 0.40 | 0.45 | 0.43 |

As seen from Table 1, at the initial steady state conditions facilities 100 and 200 are simulated to be operating within the broad maximum energy efficiency ranges of CGCs 160 and 260, and therefore neither facility is determined as needing kickback flow to maintain the minimum flow rate through either of these compressors. Next, the independent input variables to the model of facility 100 are perturbed to generate a simulation of a reduction in capacity in this facility, e.g., due to steam cracker decoking or maintenance. The KOVs for facility 100, facility 200, and the parallel train generated by the models with facility 100 operating at a reduced capacity are summarized in Table 2.

TABLE 2

| Simulated KOVs | Facility 100 | Facility 200 | Parallel Train |
|---|---|---|---|
| Kickback Flow Rate (T/hr) | 20.15 | 0.01 | — |
| Ethylene Yield (tons/hr) | 80.33 | 110.00 | 190.33 |
| CGC Power Consumption (MW) | 34.91 | 49.95 | 84.86 |
| CGC Power Consumption per Ton of Ethylene Yield (MW/T) | 0.43 | 0.45 | 0.45 |

As seen from Table 2, facility 100 is simulated as having a kickback flow rate of 20.15 T/hr in order to maintain the minimum required volumetric flow rate through CGC 160 at the reduced capacity. Kickback flow implementation in turn results in an increased simulated CGC power consumption per ton of ethylene yield of 0.02 MW/T from 0.40 MW/T to 0.43 MW/T in facility 100, and a corresponding increased simulated CGC power consumption per ton of ethylene yield of 0.02 MW/T from 0.43 MW/T to 0.45 MW/T for the overall parallel train. That is, the simulated energy efficiency of the overall parallel train decreases due to the implementation of the kickback flow in facility 100.

Moving Towards Optimizing Energy Efficiency

In order to move towards optimizing the energy efficiency of the parallel train with facility 100 operating at reduced capacity, the independent input variables to the models of facilities 100 and 200 are perturbed to generate a set of simulations of establishing an interconnecting stream flow from an interconnector origin point located in facility 200 to an interconnector destination point located in facility 100. More particularly, interconnecting stream flow is simulated by using the model of facility 100 to simulate adding an amount of fluid flow to an intermediate stream of facility 100 and then using the model of facility 200 to simulate partially withdrawing this amount of fluid flow from an intermediate stream of facility 200. The resulting minimum amount of the interconnecting stream flow rate sufficient to restore the minimum volumetric flow rate to CGC 160 without the implementation of kickback flow is 18.30 T/hr. This minimum amount is determined by varying the amount of the interconnecting stream flow rate for each simulation in the set and examining the resulting simulated KOVs. The KOVs for facility 100, facility 200, and the parallel train generated by the models with facility 100 operating at a reduced capacity and an interconnecting flow rate of 18.30 T/hr from facility 200 to facility 100 are summarized in Table 3.

TABLE 3

| Simulated KOVs | Facility 100 | Facility 200 | Parallel Train |
|---|---|---|---|
| Kickback Flow Rate (T/hr) | 0.01 | 0.01 | — |
| Ethylene Yield (tons/hr) | 86.21 | 104.01 | 190.22 |
| CGC Power Consumption (MW) | 35.12 | 47.92 | 83.05 |
| CGC Power Consumption per Ton of Ethylene Yield | 0.41 | 0.46 | 0.44 |

As seen from Table 3, with the addition of the simulated interconnecting stream from facility 200 to facility 100 at a flow rate of 18.30 T/hr, facility 100 no longer requires the implementation of kickback flow. Moreover, the simulated partial withdrawal of 18.30 T/hr from facility 200 to form the interconnecting stream is not excessive enough to necessitate the implementation of kickback flow in this facility. As a result of the elimination of kickback flow in facility 100, the simulated CGC power consumption per ton of ethylene yield decreases by 0.02 MW/T from 0.43 MW/T to 0.41 MW/T in this facility. In addition, because the amount of the partial stream withdrawal from facility 200 is low enough that no kickback flow needs to be implemented in this facility, the reduction of 0.02 MW/T in the simulated CGC power consumption per ton of ethylene yield in facility 100 is accomplished with only a corresponding increase of 0.01 MW/T from 0.45 MW/T to 0.46 MW/T of simulated CGC power consumption per ton of ethylene yield in facility 200. Consequently, upon combining the calculated energy efficiencies of the two facilities after the addition of an interconnecting stream, the simulated CGC power consumption per ton of ethylene yield is determined to decrease from 0.45 MW/T to 0.44 MW/T for the overall parallel train. That is, the simulated energy efficiency the overall parallel train increases due to the addition of the interconnecting stream. Using a typical fuel price to estimate the power consumption costs of CGCs 160 and 260, it is estimated that increasing the energy efficiency of the parallel train by introducing the interconnecting stream results in a cost savings of approximately $2.9M/y ear.

Moving Towards Optimizing Ethylene Yield

A reduction in the capacity of facility 100 to a level necessitating the implementation of a kickback loop results not only in a reduced energy efficiency of this facility, but also in a reduced ethylene yield of this facility from 93.96 T/hr to 80.33 T/hr, as seen from Tables 1 and 2. Introducing the interconnecting stream from facility 200 to facility 100 in order to move towards optimizing the energy efficiency of the parallel train somewhat improves the ethylene yield in facility 100 to 86.21 T/hr, as seen in Table 3, but does not fully restore the ethylene yield in this facility to its initial value of 93.96 T/hr. In addition, transferring the interconnecting stream from facility 200 to facility 100 results in a reduced ethylene yield of facility 200 from 110.00 T/hr to 104.01 T/hr, as seen from Tables 2 and 3. Thus, after moving towards optimizing the energy efficiency of facility 100 and the overall parallel train, there remains unrealized capacity in both facilities 100 and 200 for the production of ethylene.

In order to move towards optimizing the overall ethylene yield of the parallel train with facility 100 operating at reduced capacity and an interconnecting stream established from facility 200 to facility 100, the independent input variables to the models of facilities 100 and 200 are perturbed to generate a set of simulations of increasing both the naphtha feed flow rate to facility 200 and the interconnecting stream flow rate. The amount of the interconnecting stream flow rate sufficient to restore the ethylene yield of both facilities to their initial values with facility 200 receiving an increased naphtha feed flow is determined to be 42.83 T/hr. This amount is determined by varying the naphtha feed flow rate to facility 200 and the interconnecting stream flow rate for each simulation in the set and examining the resulting simulated KOVs. The KOVs for facility 100, facility 200, and the parallel train generated by the models with facility 100 operating at a reduced capacity, an interconnecting flow rate of 42.83 T/hr from facility 200 to facility 100, and facility 200 receiving an increased naphtha feed flow rate are summarized in Table 4.

TABLE 4

| Simulated KOVs | Facility 100 | Facility 200 | Parallel Train |
|---|---|---|---|
| Kickback Flow Rate (T/hr) | 0.01 | 0.01 | — |
| Ethylene Yield (tons/hr) | 93.96 | 110.00 | 203.96 |

TABLE 4-continued

| Simulated KOVs | Facility 100 | Facility 200 | Parallel Train |
|---|---|---|---|
| CGC Power Consumption(mw) | 38.51 | 54.05 | 92.56 |
| CGC Power Consumption per Ton of Ethylene Yield | 0.41 | 0.49 | 0.45 |

As seen in Table 4, increasing the simulated naphtha feed flow to facility 200 and the simulated interconnecting stream flow rate restores the simulated ethylene yield values for both facilities 100 and 200 to their initial values of 93.96 T/hr and 110.00 T/hr, respectively. The corresponding simulated CGC power consumption and CGC power consumption per ton of ethylene yield values are determined to increase from 83.05 MW to 92.56 MW and from 0.44 MW/T to 0.45 MW/T respectively for the overall parallel train. In other words, the simulation shows that the overall parallel train's energy efficiency decreases slightly as a result of the increased ethylene yield. However, the value derived from the production of 13.6 T/hr of additional ethylene typically exceeds the increased CGC power consumption costs, thereby resulting in a more cost-effective operation.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

For all jurisdictions in which the doctrine of "incorporation by reference" applies, all of the test methods, patent publications, patents and reference articles are hereby incorporated by reference either in their entirety or for the relevant portion for which they are referenced.

When numerical lower limits and numerical upper limits are listed herein, ranges from any lower limit to any upper limit are contemplated. The term "comprising" is synonymous with the term "including". Likewise whenever a composition, an element or a group of components is preceded with the transitional phrase "comprising", it is understood that we also contemplate the same composition or group of components with transitional phrases "consisting essentially of", "consisting of", "selected from the group of consisting of", or "is" preceding the recitation of the composition, component, or components, and vice versa.

The invention claimed is:

1. A chemical conversion process, the process comprising:
    (a) providing a parallel train of hydrocarbon cracking facilities, wherein the parallel train comprises
        (i) a first cracking facility including n process units, the n process units including at least one first separation unit, where n is a whole number;
        (ii) a second cracking facility including m process units, the m process units including at least one second separation unit, where m is a whole number; and
        (iii) a model of at least the first facility;
    (b) establishing for the parallel train
        (i) a first fluid flow into the first facility upstream of a first process unit;
        (ii) a second fluid flow into the second facility upstream of a second process unit to generate a second cracked product;
        (iii) an interconnecting third fluid flow from a first interconnector origin point in the second facility downstream of the second process unit and upstream of the $m^{th}$ process unit, to a first interconnector destination point in the first facility downstream of the first process unit and upstream of the $n^{th}$ process unit; and
        (iv) one or more parameters to be optimized in each facility;
    (c) determining for the parallel train an optimal range for at least one of the first facility's parameters;
    (d) generating a simulation for the parallel train using the model to simulate removing from service fewer than n of the first facility's process units, wherein the removing results in a deviation from the optimal range;
    (e) obtaining from the simulation an amount of the third fluid flow in order to lessen the deviation; and
    (f) diverting the obtained amount of the third fluid flow in the parallel train from the first interconnector origin point to the first interconnector destination point, at least a portion of the diverted amount of the third fluid flow being combined with at least a portion of a first cracked product generated in the first facility.

2. The process of claim 1, wherein the parameters comprise at least one of energy efficiency, product yield, profit margin, and cost.

3. The process of claim 1, wherein at least one of the first facility and the second facility is a thermal cracking facility.

4. The process of claim 1, wherein the model of the first facility and/or a model of the second facility is a linear programming model derived from a non-linear reference model.

5. The process of claim 1, wherein at least one of the first process unit and the second process unit is a steam cracker furnace.

6. The process of claim 5, wherein the first facility comprises a kickback loop,
    wherein activating the kickback loop comprises recycling an amount of a fourth fluid flow from a kickback loop origin point downstream of a compression stage to a kickback loop destination point upstream of the compression stage,
    wherein the kickback loop is activated if a total amount of fluid flow into the compression stage is less than a specified minimum total amount,
    and wherein the amount of the diverted third fluid flow is the minimum amount such that the kickback loop is not activated.

7. The process of claim 5, further comprising establishing an interconnecting fifth fluid flow from a second interconnector origin point in the first facility downstream of the first interconnector destination point and upstream of the $n^{th}$ process unit, to a second interconnector destination point in the second facility downstream of the first interconnector origin point and upstream of the $m^{th}$ process unit.

8. The process of claim 7, further comprising:
    (g) generating a simulation for the parallel train of diverting the obtained amount of the third fluid flow from the first interconnector origin point to the first interconnector destination point using a model of the second facility.

9. The process of claim 8, further comprising:
(h) obtaining from the simulation using the model of the second facility a predicted amount of the second facility's energy efficiency;
(i) determining an optimal range of the second facility's energy efficiency;
(j) determining if the predicted amount is within the optimal range of the second facility's energy efficiency; and
(k) decreasing the amount of the third fluid flow if the predicted amount is not within the optimal range of the second facility's energy efficiency.

10. The process of claim 8, further comprising:
(h) obtaining from the simulation using the model of the second facility an amount of the second fluid flow in order to move towards optimizing one of the second facility's parameters; and
(i) increasing the amount of the second fluid flow to the obtained amount.

11. In a steam cracking process for producing ethylene comprising a parallel train having at least a first and a second steam cracking facility, a first fluid flow into the first facility upstream of a first process unit, and a second fluid flow into the second facility upstream of a second process unit to generate a second cracked product, wherein the first facility has n process units, then process units comprising at least one first separation unit and one or more first compression units, and wherein the second facility has m process units, the m process units comprising at least one second separation unit and one or more second compression units, where n and m are whole numbers, the improvement comprising:
(a) establishing
  (i) an interconnecting third fluid flow from a first interconnector origin point in the second facility downstream of the second process unit and upstream of the $m^{th}$ process unit, to a first interconnector destination point in the first facility downstream of the first process unit and upstream of the $n^{th}$ process unit; and
  (ii) one or more parameters to be optimized in each facility;
(b) determining for the parallel train an optimal range for at least one of the first facility's parameters using a model of the first facility;
(c) generating a simulation for the parallel train using the model for removing from service fewer than n of the first facility's process units, wherein the removing results in a deviation from the optimal range;
(d) obtaining from the simulation an amount of the interconnecting third fluid flow in order to lessen the deviation; and
(e) diverting the obtained amount of the interconnecting third fluid flow in the parallel train from the first interconnector origin point to the first interconnector destination point, at least a portion of the diverted amount of the third fluid flow being combined with at least a portion of a first cracked product generated in the first facility.

12. The process of claim 11, wherein the parameters comprise at least one of energy efficiency, product yield, profit margin, and cost.

13. The process of claim 11, wherein the model of the first facility and/or a model of the second facility is a linear programming model derived from a non-linear reference model.

14. The method of claim 13, further comprising establishing a fourth interconnecting fluid flow from a second interconnector origin point in the first facility downstream of the first interconnector destination point, to a second interconnector destination point in the second facility downstream of the first interconnector origin point.

\* \* \* \* \*